US008833657B2

(12) United States Patent
Johnson

(10) Patent No.: US 8,833,657 B2
(45) Date of Patent: Sep. 16, 2014

(54) MULTI-PASS BIOMETRIC SCANNER

(76) Inventor: Willie Anthony Johnson, Plano, TX (US)

(*) Notice: Subject to any disclaimer, the term of this patent is extended or adjusted under 35 U.S.C. 154(b) by 0 days.

(21) Appl. No.: 13/075,082

(22) Filed: Jun. 22, 2011

(65) Prior Publication Data

US 2011/0253785 A1 Oct. 20, 2011

(51) Int. Cl.
*G06K 7/00* (2006.01)
*G06K 7/10* (2006.01)
*G06K 7/14* (2006.01)
*G06K 7/04* (2006.01)
*G06F 21/00* (2013.01)
*G06K 9/00* (2006.01)

(52) U.S. Cl.
USPC ........... 235/439; 235/440; 235/454; 235/446; 713/186; 382/116; 382/126

(58) Field of Classification Search
CPC .......... G06K 9/00006; G06K 9/00026; G06K 9/0002; G06K 9/00033; G06K 9/209
USPC .......... 382/124, 116, 126, 115; 235/454, 439, 235/440, 446; 713/186
See application file for complete search history.

(56) References Cited

U.S. PATENT DOCUMENTS

| | | | | |
|---|---|---|---|---|
| 4,262,623 A * | 4/1981 | Smith et al. | ............. | 118/31.5 |
| 4,736,098 A * | 4/1988 | Rehrig | ............. | 250/222.1 |
| 5,485,006 A * | 1/1996 | Allen et al. | ............. | 250/222.1 |
| 5,495,102 A * | 2/1996 | Fine | ............. | 250/222.1 |
| 6,067,368 A * | 5/2000 | Setlak et al. | ............. | 382/124 |
| 6,201,473 B1 * | 3/2001 | Schaffer | ............. | 340/568.5 |
| 6,259,804 B1 * | 7/2001 | Setlak et al. | ............. | 382/124 |
| 6,376,930 B1 * | 4/2002 | Nagao et al. | ............. | 307/10.2 |
| 6,539,101 B1 * | 3/2003 | Black | ............. | 382/124 |
| 6,542,079 B1 * | 4/2003 | Kahl, Sr. | ............. | 340/568.5 |
| 6,631,201 B1 * | 10/2003 | Dickinson et al. | ............. | 382/124 |
| 6,741,177 B2 * | 5/2004 | Ballantyne | ............. | 340/568.5 |
| 7,203,344 B2 * | 4/2007 | McClurg et al. | ............. | 382/115 |
| 7,246,745 B2 * | 7/2007 | Hudnut et al. | ............. | 235/383 |
| 7,392,939 B2 * | 7/2008 | Hauke et al. | ............. | 235/380 |
| 7,539,329 B2 * | 5/2009 | Sellers | ............. | 382/124 |
| 7,590,269 B2 * | 9/2009 | Creasey et al. | ............. | 382/124 |
| 7,660,442 B2 * | 2/2010 | Sweeney et al. | ............. | 382/115 |
| 7,660,447 B2 * | 2/2010 | Fujii | ............. | 382/124 |
| 7,822,232 B2 * | 10/2010 | Black | ............. | 382/116 |
| 7,868,759 B2 * | 1/2011 | Zimmerman | ............. | 340/568.5 |
| 7,883,012 B2 * | 2/2011 | Tabet et al. | ............. | 235/383 |
| 8,077,935 B2 * | 12/2011 | Geoffroy et al. | ............. | 382/126 |
| 8,224,043 B2 * | 7/2012 | Yamada | ............. | 382/124 |
| 8,267,316 B2 * | 9/2012 | Ostrowski et al. | ............. | 235/383 |
| 2001/0026636 A1 * | 10/2001 | Mainguet | ............. | 382/124 |
| 2001/0036299 A1 * | 11/2001 | Senior | ............. | 382/124 |
| 2002/0145037 A1 * | 10/2002 | Goodwin, III | ............. | 235/383 |

(Continued)

FOREIGN PATENT DOCUMENTS

JP  2002358512 A * 12/2002 ............. G06T 1/00
WO WO 2007042918 A2 * 4/2007 ............. A61B 5/117

*Primary Examiner* — Daniel Walsh

(57) ABSTRACT

A biometric scanner comprising a fingerprint module, a first plurality of fingerprint sensors, and a sensor circuit within the fingerprint module. The first plurality of fingerprint sensors is ergonomically positioned on the fingerprint module to accommodate a second plurality of fingertips of a human hand. The sensor circuit is coupled to the first plurality of fingerprint sensors wherein fingerprints of the second plurality are captured simultaneously by the sensor circuit. A biometric scanner system and a method of manufacturing a biometric scanner are also provided.

27 Claims, 3 Drawing Sheets

(56) References Cited

U.S. PATENT DOCUMENTS

| | | | |
|---|---|---|---|
| 2003/0169905 A1* | 9/2003 | Butterworth | 382/115 |
| 2003/0184440 A1* | 10/2003 | Ballantyne | 340/568.5 |
| 2004/0125993 A1* | 7/2004 | Zhao et al. | 382/124 |
| 2005/0052412 A1* | 3/2005 | McRae et al. | 345/158 |
| 2005/0089202 A1* | 4/2005 | Setlak et al. | 382/124 |
| 2005/0100199 A1* | 5/2005 | Boshra | 382/124 |
| 2005/0189412 A1* | 9/2005 | Hudnut et al. | 235/383 |
| 2006/0008127 A1* | 1/2006 | Sellers | 382/124 |
| 2006/0032914 A1* | 2/2006 | Brewster et al. | 235/383 |
| 2006/0060802 A1* | 3/2006 | Richter et al. | 250/556 |
| 2006/0093192 A1* | 5/2006 | Bechtel | 382/126 |
| 2006/0120573 A1* | 6/2006 | Iori | 382/124 |
| 2006/0147087 A1* | 7/2006 | Goncalves et al. | 382/103 |
| 2006/0243803 A1* | 11/2006 | Hauke et al. | 235/454 |
| 2006/0290494 A1* | 12/2006 | O'Brien | 340/568.5 |
| 2007/0084918 A1* | 4/2007 | Tabet et al. | 235/383 |
| 2007/0086629 A1* | 4/2007 | Drews et al. | 382/124 |
| 2007/0154073 A1* | 7/2007 | Hamid et al. | 382/124 |
| 2007/0292009 A1* | 12/2007 | Nguyen et al. | 382/124 |
| 2008/0029603 A1* | 2/2008 | Harris | 235/462.31 |
| 2008/0137631 A1* | 6/2008 | de Clerq et al. | 370/338 |
| 2008/0260214 A1* | 10/2008 | Hauke et al. | 382/124 |
| 2009/0055537 A1* | 2/2009 | Takei et al. | 709/227 |
| 2011/0038513 A1* | 2/2011 | Du et al. | 382/124 |
| 2011/0253785 A1* | 10/2011 | Johnson | 235/439 |
| 2011/0260966 A1* | 10/2011 | Okazaki | 345/156 |
| 2012/0014569 A1* | 1/2012 | Frye et al. | 382/124 |
| 2012/0076369 A1* | 3/2012 | Abramovich et al. | 382/124 |
| 2013/0004031 A1* | 1/2013 | Abiko | 382/124 |
| 2013/0027184 A1* | 1/2013 | Endoh | 340/5.83 |

\* cited by examiner

MULTI-PASS BIOMETRIC SCANNER

CROSS REFERENCE TO RELATED APPLICATION

This application claims priority to U.S. Provisional application No. 61/294,858 filed on Mar. 30, 2010 to Willie Anthony Johnson entitled "Multi-Pass Biometric Scanner" and is incorporated herein by reference.

TECHNICAL FIELD

This application is directed, in general, to a biometric scanner and, more specifically, to a portable biometric scanner for field use.

BACKGROUND

Today, identification of detained personnel by biometric data must be accomplished by transporting the detainee to a fixed location having suitable means for the collection of the desired biometric data, e.g., fingerprint(s), voice and retinal scan, measurement of facial features, etc. Such equipment is routinely found only at well established offices of the detaining entity.

In the field, i.e., in areas not dedicated to biometric data collection, biometric identification is often limited to one fingerprint or one retina scan for the purpose of admission to a controlled area or preliminary identification of the subject with confirmation of identity being postponed until more detailed identification is possible. Therefore, what is needed in the art is a device or system that can simultaneously collect a plurality of biometric data.

SUMMARY

One aspect provides a biometric scanner comprising a fingerprint module, a first plurality of fingerprint sensors, and a sensor circuit within the fingerprint module. The first plurality of fingerprint sensors is ergonomically positioned on the fingerprint module to accommodate a second plurality of fingertips of a human hand. The sensor circuit is coupled to the first plurality of fingerprint sensors wherein fingerprints of the second plurality are captured simultaneously by the sensor circuit. A method of manufacturing a biometric scanner is also provided.

A further aspect provides a biometric scanner system comprising a fingerprint module, a first plurality of fingerprint sensors, a sensor circuit and an interface module. The first plurality of fingerprint sensors is ergonomically positioned on the fingerprint module to accommodate a second plurality of fingertips of a human hand. The sensor circuit within the fingerprint module is coupled to the first plurality of fingerprint sensors, wherein fingerprints of the second plurality of fingertips are captured simultaneously by the sensor circuit. The interface module is coupleable to the fingerprint module and configured to communicate with a remote central server.

BRIEF DESCRIPTION

Reference is now made to the following descriptions taken in conjunction with the accompanying drawings, in which.

DETAILED DESCRIPTION

For the purpose of this disclosure, the term "ergonomically" means: accommodating the unique physical limitations and capabilities of the human hand, e.g., the arrangement of the four fingers (or digits 2 through 5 as they are sometimes identified) and an opposing thumb for grasping limits the ability to collect five useable fingerprints from one hand simultaneously when the receptors are in/on a single flat surface.

Figure 1:
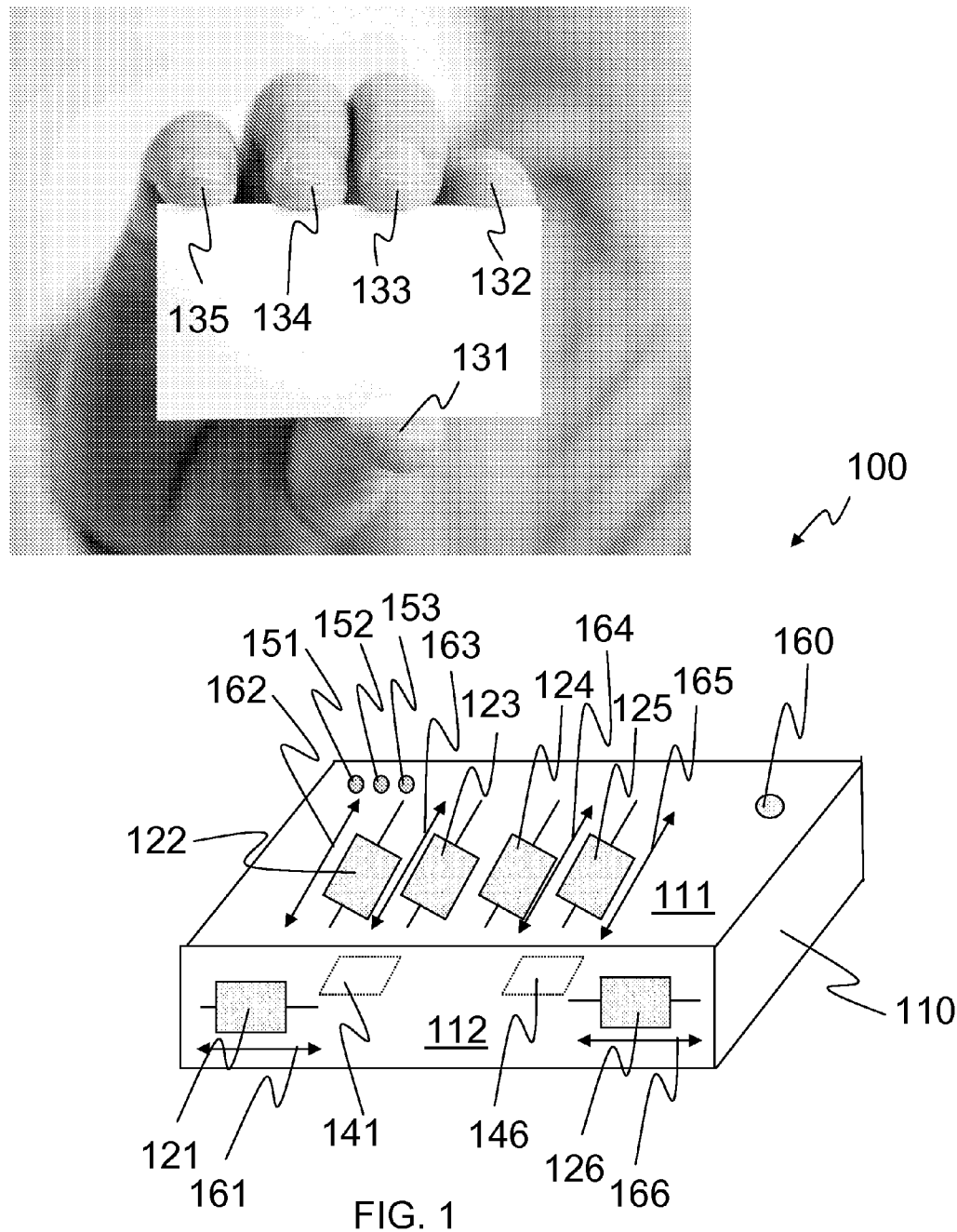
FIG. 1 is an isometric view of one embodiment of a biometric scanner 100 constructed in accordance with the present disclosure.

Referring initially to FIG. 1, illustrated is an isometric view of one embodiment of a biometric scanner 100 constructed in accordance with the present disclosure. The biometric scanner 100 comprises a fingerprint module 110, and a first plurality of fingerprint sensors 121-126. A portion, i.e., fingerprint sensors 122-125, of the first plurality of fingerprint sensors 121-126 may be ergonomically positioned on an upper surface 111 of the fingerprint module 110 to accommodate a second plurality of fingertips 132-135 of a human hand 130. The first plurality of fingerprint sensors 121-126 may be "two-handed." That is, the fingerprint sensors 121-126 may be positioned so as to severally accommodate both left and right human hands, up to five digits at a time. Specifically, two fingerprint sensors 121, 126 may be configured on a front surface 112 of the fingerprint module 110 to conveniently accommodate the unique position of the thumbs relative to the other digits of the human hand. Nonetheless, other positions for the plurality of fingerprint sensors 121-126 are within the purview of this disclosure.

The fingerprint sensors 121-126 may be individually slidably mounted to surfaces 111, 112 of the fingerprint module 110 as indicated by arrows 161-166. Slidably mounting the fingerprint sensors 121-126 allows individual adjustment of the fingerprint sensors 121-126 relative to one another to accommodate large to small hand sizes, loss of partial digits, etc., thereby achieving a more accurate fingerprint scan. A completely missing digit due to any cause may be recorded by the fingerprint module 110 as "no individual fingerprint."

The first plurality of fingerprint sensors 121-126 is electrically coupled to a like plurality of sensor circuits 141-146 (142-145 not shown) located within the fingerprint module 110. The fingerprint sensors 121-126 may individually be UPEK/Authentec TouchChip TCS1C sensors, a product of (manufacturer) UPEK/Authentec of Melbourne, Fla., to be used with sensor circuits 141-146 which may be Suprema SFM3050-TC1 modules, a product of (manufacturer) Suprema Inc 16F Parkview Office Tower of Jeongja-dong, Bundang-gu Seongnam, Gyeonggi, 463-863 South Korea. Other fingerprint sensor designs and manufacturers are within the purview of this disclosure. In a preferred embodiment, the first plurality of fingerprint sensors 121-126 and the sensor circuits 141-146 are of sufficient accuracy to meet Federal Bureau of Investigation (FBI) Fingerprint Standards.

The fingerprint module 110 further comprises a plurality of status light emitting diodes (LEDs) 151-153 and a power button 160. The LEDs 151-153 may be individually of yellow, green and red colors to signify to the operator: "fingerprint capture in progress," "valid fingerprint capture," and "fingerprint capture failure," respectively. The first plurality of fingerprint sensors 121-126, the sensor circuits 141-146 and LEDs 151-156 may be powered by an internal battery or batteries (not shown) of suitable voltage within the fingerprint module 110. One who is of skill in the art will recognize the opportunity to use rechargeable batteries of the necessary voltage and amperage in this application. Power to the fingerprint sensors 121-126, sensor circuits 141-146, and LEDs 151-153 may be controlled by the power button 160. The fingerprint module 110 preferably comprises a real time operating system.

Figure 2:
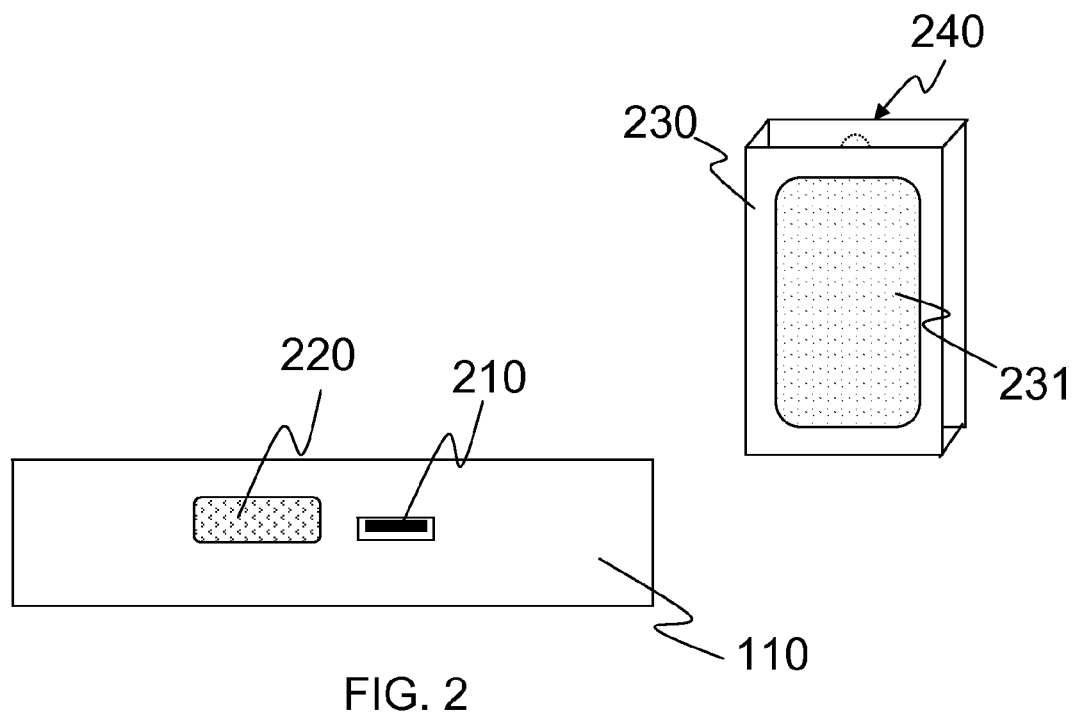
FIG. 2 is a rear elevation view of the fingerprint module 110 of FIG. 1 and an isometric view of a generic interface module 230.

Referring now to FIG. 2, illustrated is a rear elevation view of the fingerprint module 110 of FIG. 1 and an isometric view of a generic interface module 230. The fingerprint module 110 may further comprise a USB connector 210 (e.g., USB 2.0 in one embodiment) and/or an RS-232 connector 220. The USB connector 210 or the RS-232 connector 220 is used for wired communication with the interface module 230 suitably equipped with an appropriate connector and bus. Alternatively, the interface module 230 may communicate with the fingerprint module 110 wirelessly using any suitable standard to include, cellular, WIFI, Bluetooth®, ZigBee®, etc. Bluetooth® is a registered trademark of Bluetooth® Sig, Inc. of Kirkland, Wash. ZigBee® complies with IEEE standard 802.15.4 and ZigBee® is a registered trademark of ZigBee® Alliance Corporation of San Ramon, Calif.

The interface module 230 may be a portable computing device such as: a handheld, tablet, laptop or desktop computer, etc., as directed by the end user and compatible with the fingerprint module's 110 connectors. Alternatively, the interface module 230 may be a specialized computing device so that it may be physically coupled to the fingerprint module 110. Of course, the interface module 230, regardless of form, may require an appropriate operating system and device drivers for the biometric data collection functions. The interface module 230 is preferably powered by an internal rechargeable battery (not shown) with a backup of a battery charger/power converter (not shown). The battery charger/power converter may be capable of charging/power conversion from worldwide AC power (110-240 VAC), and 12 V or 24 V DC.

The interface module 230, in one embodiment, controls the capture of biometric data by the fingerprint module 110. Additionally, the interface module 230 may have computer functions accessed through a touch screen 231 that may be used by the operator to enter known information about the subject/operation being identified, such as: a project name or number for Border Patrol, Military, or program security; subject's presumed name; subject's height; subject's weight; subject's hair color; subject's eye color; subject's race; subject's age; device's location; the operator's name; etc. The interface module 230 may incorporate a flash memory slot (not shown) for saving data to removable media.

The interface module 230 may incorporate a digital camera 240 for collecting facial feature data on the subject. Alternatively, in low light conditions where it may be undesirable to have high ambient light, the camera may be IR sensitive and an added IR illuminator incorporated in the interface module 230 to illuminate the subject. Alternatively or additionally, the camera 240 may collect real time video and sound which can be output through a selected external video output to an external display. In one embodiment, the external video output may be a VGA port. Operation of the camera to include: start, zoom, stop, edit, erase, etc., may be controlled from the touch screen 231 so that individual physical camera controls are not necessary. Alternatively, a remote camera (not shown), separate from the interface module 230, may be used and camera control exercised by the interface module 230 as if the interface module were attached to the camera. The interface to the remote camera may be wired or wireless using appropriate communication protocols. In this configuration, that which the remote camera sees would be displayed on the touch screen 231 to aid in photo composition. The interface module 230 may also incorporate a one-dimensional laser scanner (not shown) for obtaining facial feature data of the subject and/or an iris scanner for iris identification.

Figure 3:
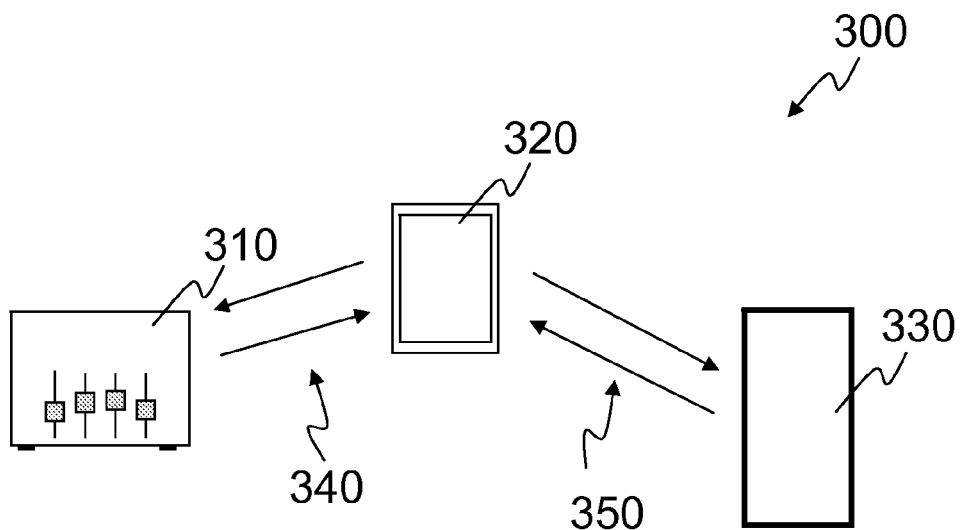
FIG. 3 is a plan view of a basic biometric scanner system 300 constructed in accordance with the principles of the present disclosure.

Referring now to FIG. 3, illustrated is a plan view of a basic biometric scanner system 300 constructed in accordance with the principles of the present disclosure. The basic biometric scanner system 300 may comprise a fingerprint module 310, an interface module 320 and a remote server 330. The fingerprint module 310 and the interface module 320 may conduct two-way communication as at 340. The interface module 320 and the remote server 330 may conduct two-way communication as at 350. One who is of skill in the art will recognize that the communication links shown may be of several different standards as previously discussed. Each standard has advantages and disadvantages which must be traded off in the adoption of standards for a given user system. The present discussion will be limited to a high-level as to how the identification of a subject is accomplished.

Figure 4:
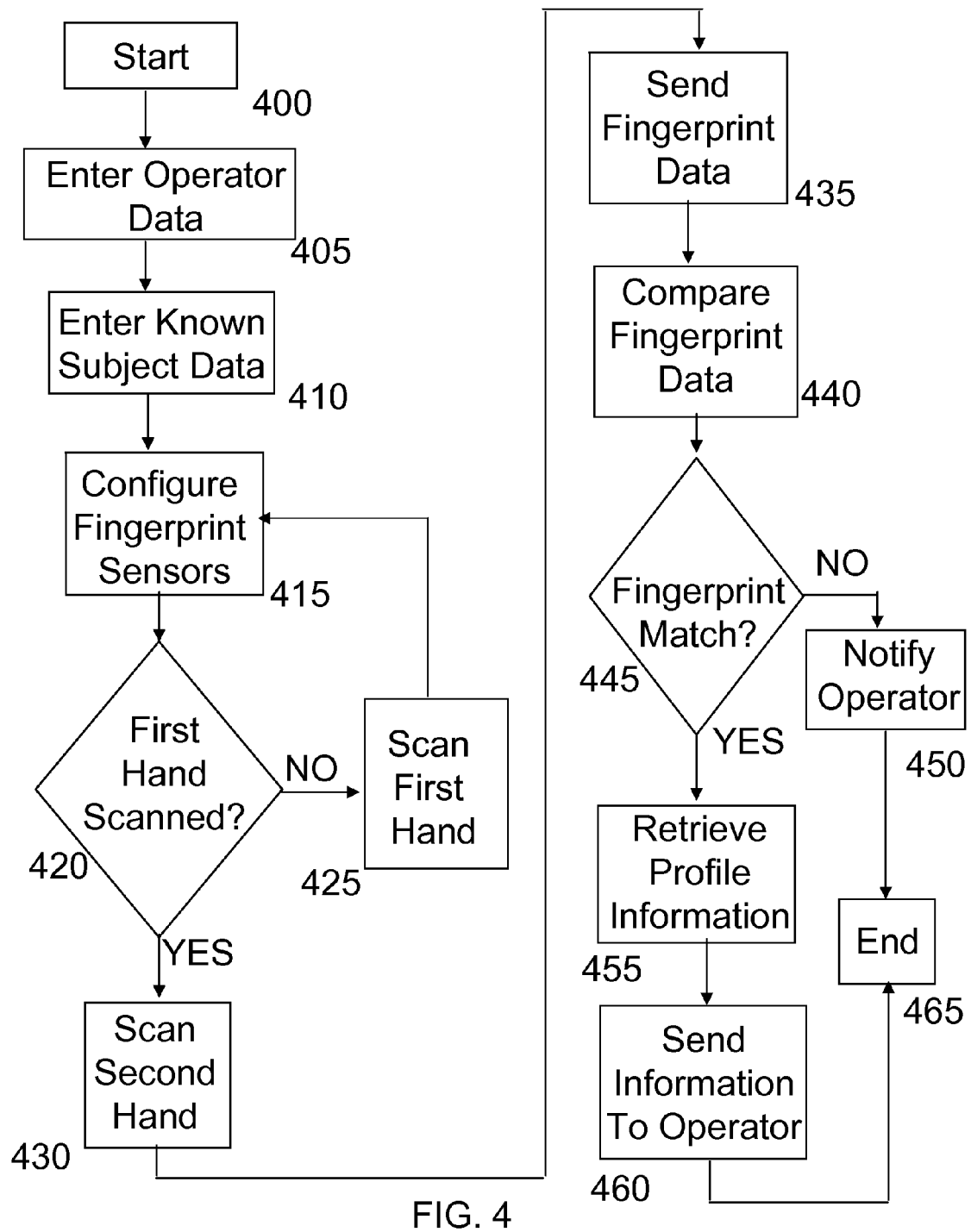
FIG. 4 is a flow chart of the steps in the identification of a subject.

Referring now to FIG. 4 with continuing reference to FIG. 3, illustrated is a flow chart of the steps in the identification of a subject. For the sake of brevity, discussion of these steps will be limited to fingerprint capture and matching. One who is of skill in the art may readily broaden the feature identification steps to include: facial feature measurements, voice identification, retinal scan data, etc.

Identification begins at Start Step 400. Operator information is entered into the interface module 320 at Step 405. Known subject information is entered into the interface module 320 at Step 410. The fingerprint sensors are configured for the first hand at Step 415. The query "Is First Hand Scanned?" is answered at Step 420. If the answer to Step 420 is "NO", the flow chart proceeds to scan the first hand at Step 425 and the chart returns to "Configure Fingerprint Sensors" at Step 415. At Step 420, the answer to the query "Is First Hand Scanned?" is answered as "YES" and the algorithm proceeds to "Scan Second Hand" at Step 430. The algorithm proceeds to "Send Fingerprint Data" to the remote server 330 at Step 435. The remote server 330 "Compares Fingerprint Data" to a remote database at Step 440. The query "Fingerprint Match?" is answered at Step 445. If the answer to Step 445 is "NO", the flow chart proceeds to "Notify Operator" of no match at Step 450 and then to "END" at Step 465. If the answer to Step 445 is "YES", the flow chart proceeds to "Retrieve Profile Information" at Step 455. The flow chart then proceeds to "Send Retrieved Information to Operator" at Step 460 and then to "END" at Step 465.

In general, each of the off-site components of the portable biometric scanner system should be configured to be moisture resistant and readily transported by a single adult human. Specifically, the fingerprint module 110 and the interface module 230 may be configured to couple to a belt on a human operator.

It should be noted that the biometric scanner of the present disclosure has application to a wide variety of users, e.g., law enforcement, military, border patrol, defense contractors, high security laboratories, etc. Each of these users may require specific enhancements to the subject biometric scanner system and its components, such as: component shock mounting, crush resistant carrying cases, water resistant enclosures for the military; operator biometric identification, e.g., iris scan, facial feature identification, as well as access card and personal identification number (PIN) before entry for high security laboratories; GPS incorporation in the fingerprint module or interface module for military, border patrol or homeland security; stand-alone interface module with simultaneous fingerprint and photo capture with interface module identification for parole enforcement, Coast Guard, etc. The accommodation of these specific requirements is in no way to be construed as limiting the claims of the present disclosure.

For the purposes of this discussion, use of the terms "providing" and "forming," etc., includes: manufacture, subcontracting, purchase, etc. Those skilled in the art to which this application relates will appreciate that other and further additions, deletions, substitutions and modifications may be made to the described embodiments.

What is claimed is:

1. A biometric scanner, comprising: a fingerprint module; a first plurality of fingerprint sensors ergonomically positioned on said fingerprint module to accommodate a second plurality of fingertips of a human hand of a user, wherein at least two of said first plurality are manually slidable sensors, operable to slide in a substantially linear manner, individually mounted to an outer surface of the fingerprint module, such that prior to the capturing, the slidable sensors are configured to be manually adjusted relative to one another by the user linearly sliding the sensors to accommodate small to large hand sizes, and further wherein each of the first plurality of fingerprint sensors is configured to capture a corresponding fingerprint of each of the second plurality of fingertips; and a sensor circuit within said fingerprint module and coupled to said first plurality.

2. The biometric scanner as recited in claim 1 wherein said first plurality is positioned on said fingerprint module to severally accommodate a left human hand and a right human hand.

3. The biometric scanner as recited in claim 1 further comprising a communication link configured to couple said fingerprint module to an interface module.

4. The biometric scanner as recited in claim 3 wherein said communication link complies with a wireless standard.

5. The biometric scanner as recited in claim 4 wherein said wireless standard is: cellular, WIFI, ZigBee® or Bluetooth®.

6. The biometric scanner as recited in claim 3 wherein said communication link complies with a wired standard.

7. The biometric scanner as recited in claim 6 wherein said wired standard is USB 2.0 or RS-232.

8. The biometric scanner as recited in claim 1 wherein said biometric scanner is readily transportable by a single ordinary human being.

9. A biometric scanner system, comprising: a fingerprint module; a first plurality of fingerprint sensors ergonomically positioned on said fingerprint module to accommodate a second plurality of fingertips of a human hand of a user, wherein at least two of said first plurality are manually slidable sensors, operable to slide in a substantially linear manner, individually mounted to an outer surface of the fingerprint module, such that prior to the capturing, the slidable sensors are configured to be manually adjusted relative to one another by the user linearly sliding the sensors to accommodate small to large hand sizes, and further wherein each of the first plurality of fingerprint sensors is configured to capture a corresponding fingerprint of each of the second plurality of fingertips; a sensor circuit within said fingerprint module and coupled to said first plurality; and an interface module coupleable to said fingerprint module and configured to communicate with a remote central server.

10. The system as recited in claim 9 wherein said first plurality is positioned on said fingerprint module to severally accommodate a left human hand and a right human hand.

11. The system as recited in claim 9 wherein said fingerprint module couples to said interface module over a communication link.

12. The system as recited in claim 11 wherein said communication link complies with a wired standard of USB 2.0 or RS-232.

13. The system as recited in claim 11 wherein said communication link complies with a wireless standard of cellular, WIFI, ZigBee® or Bluetooth®.

14. The system as recited in claim 9 wherein said system is readily transportable by a single ordinary human being.

15. A method of manufacturing a biometric scanner, comprising: providing a fingerprint module; ergonomically positioning a first plurality of fingerprint sensors on said fingerprint module to accommodate a second plurality of fingertips of a human hand of a user, wherein at least two of said first plurality are manually slidable sensors, operable to slide in a substantially linear manner, individually mounted to an outer surface of the fingerprint module, such that prior to the capturing, the slidable sensors are configured to be manually adjusted relative to one another by the user linearly sliding the sensors to accommodate small to large hand sizes, and further wherein each of the first plurality of fingerprint sensors is configured to capture a corresponding fingerprint of each of the second plurality of fingertips; providing a sensor circuit within said fingerprint module; and coupling said sensor circuit to said first plurality, wherein fingerprints of said second plurality are captured simultaneously by said sensor circuit.

16. The method as recited in claim 15 wherein ergonomically positioning includes positioning said first plurality on said fingerprint module to severally accommodate a left human hand and a right human hand.

17. The method as recited in claim 15 further comprising providing a communication link configured to couple said fingerprint module to an interface module.

18. The method as recited in claim 17 wherein said communication link complies with a communication standard selected from the group consisting of:
cellular;
WIFI;
Bluetooth®
ZigBee®;
USB 2.0; and
RS-232.

19. The biometric scanner as recited in claim 1 wherein said sensor circuit programs at least one of said plurality of fingerprint sensors to accommodate a human hand having less than five digits.

20. The system as recited in claim 9 wherein said sensor circuit programs at least one of said plurality of fingerprint sensors to accommodate a human hand having less than five digits.

21. The method as recited in claim 15 wherein providing a sensor circuit includes providing a sensor circuit configured to program at least one of said plurality of fingerprint sensors to accommodate a human hand having less than five digits.

22. The biometric scanner as recited in claim 1 wherein fingerprints of said second plurality are captured simultaneously by said sensor circuit.

23. The system as recited in claim 9 wherein fingerprints of said second plurality are captured simultaneously by said sensor circuit.

24. The method as recited in claim 15 wherein fingerprints of said second plurality are captured simultaneously by said sensor circuit.

25. The biometric scanner as recited in claim 1 wherein at least one of said first plurality of fingerprint sensors is located on a first surface and at least one other of said fingerprint sensors is located on a second different surface, and further wherein the first and second surfaces are substantially perpendicular to one another.

26. The system as recited in claim 9 wherein at least one of said first plurality of fingerprint sensors is located on a first surface and at least one other of said fingerprint sensors is located on a second different surface, and further wherein the first and second surfaces are substantially perpendicular to one another.

27. The method as recited in claim 15 wherein at least one of said first plurality of fingerprint sensors is located on a first surface and at least one other of said fingerprint sensors is located on a second different surface, and further wherein the first and second surfaces are substantially perpendicular to one another.

\* \* \* \* \*